United States Patent
Nada et al.

(10) Patent No.: US 9,923,217 B2
(45) Date of Patent: Mar. 20, 2018

(54) METHOD OF CONTROLLING FUEL CELL SYSTEM

(71) Applicant: TOYOTA JIDOSHA KABUSHIKI KAISHA, Toyota-shi, Aichi-ken (JP)

(72) Inventors: Mitsuhiro Nada, Toyota (JP); Yutaka Tano, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/133,350

(22) Filed: Apr. 20, 2016

(65) Prior Publication Data
US 2016/0315338 A1 Oct. 27, 2016

(30) Foreign Application Priority Data
Apr. 24, 2015 (JP) .................................. 2015-089355

(51) Int. Cl.
| | | |
|---|---|---|
| H01M 8/043 | (2016.01) | |
| H01M 8/04082 | (2016.01) | |
| H01M 8/04089 | (2016.01) | |
| H01M 8/04746 | (2016.01) | |
| H01M 8/04228 | (2016.01) | |
| H01M 8/04955 | (2016.01) | |
| H01M 8/04303 | (2016.01) | |
| H01M 8/04223 | (2016.01) | |
| B60L 11/18 | (2006.01) | |
| H01M 8/0438 | (2016.01) | |
| H01M 8/1018 | (2016.01) | |

(52) U.S. Cl.
CPC ..... *H01M 8/04228* (2016.02); *B60L 11/1883* (2013.01); *H01M 8/0438* (2013.01); *H01M 8/04089* (2013.01); *H01M 8/04201* (2013.01); *H01M 8/04253* (2013.01); *H01M 8/04303* (2016.02); *H01M 8/04753* (2013.01); *H01M 8/04955* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

2013/0052553 A1\* 2/2013 Inagi ................. H01M 8/04014
429/429

FOREIGN PATENT DOCUMENTS

| JP | 2004-148980 | 5/2004 |
|---|---|---|
| JP | 2010-177111 A | 8/2010 |
| JP | 2011-156896 | 8/2011 |
| JP | 2011-185357 A | 9/2011 |

\* cited by examiner

*Primary Examiner* — Yoshitoshi Takeuchi
(74) *Attorney, Agent, or Firm* — Finnegan, Henderson, Farabow, Garrett & Dunner, LLP

(57) ABSTRACT

There is provided a method of controlling a fuel cell system comprising a fuel cell, a tank that is configured to store a fuel gas filled through a filler port of fuel gas provided in an outer plate of a vehicle, and a main stop valve that is configured to change over between opening and closing to open and close a fuel passage arranged from the tank to the fuel cell. The method comprises controlling the main stop valve to change over from opening to closing in response to detection of an operation for gas filling to fill the fuel gas into the tank, when a control accompanied with opening of the main stop valve is performed during a stop of the vehicle.

6 Claims, 6 Drawing Sheets

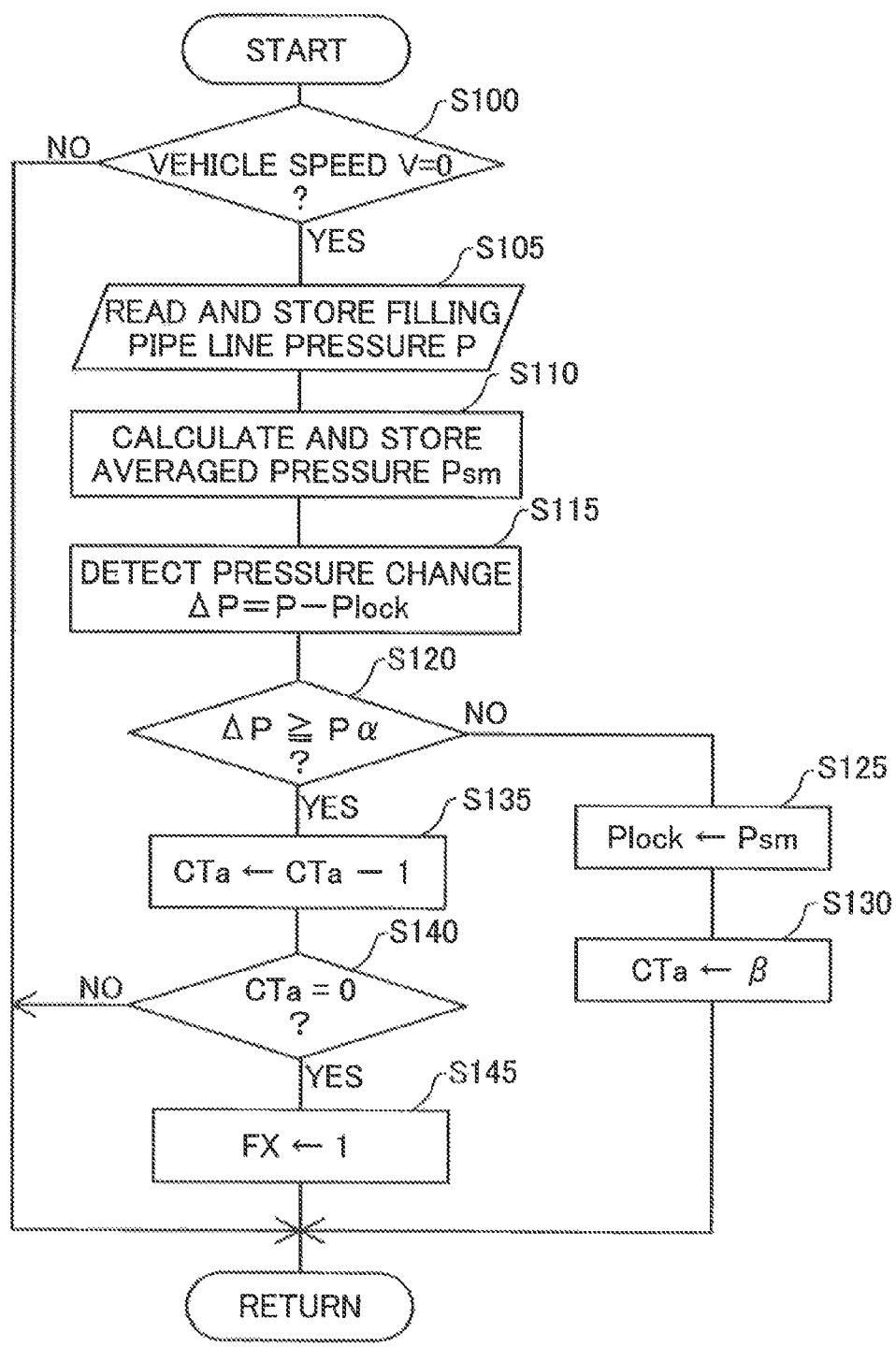

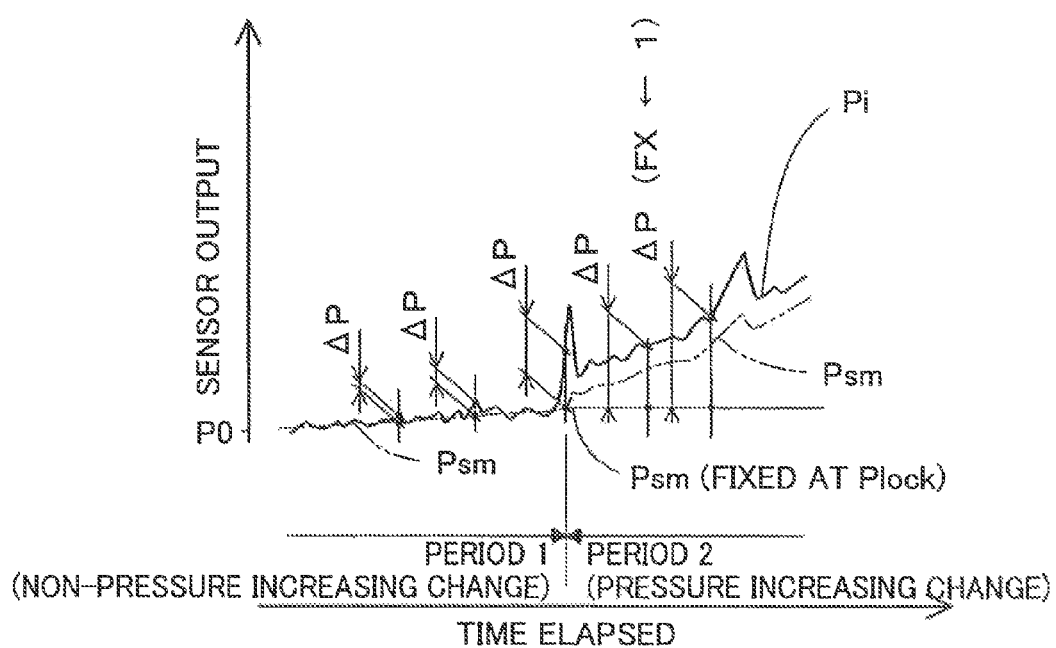

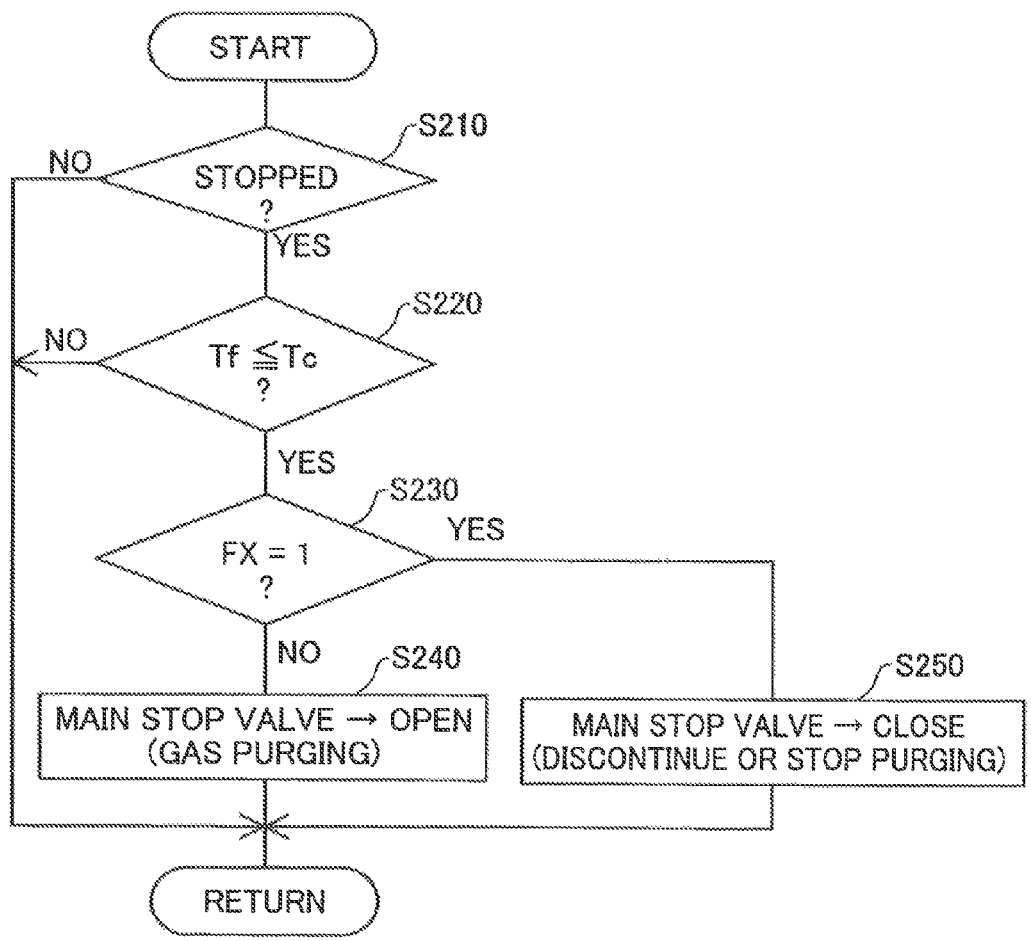

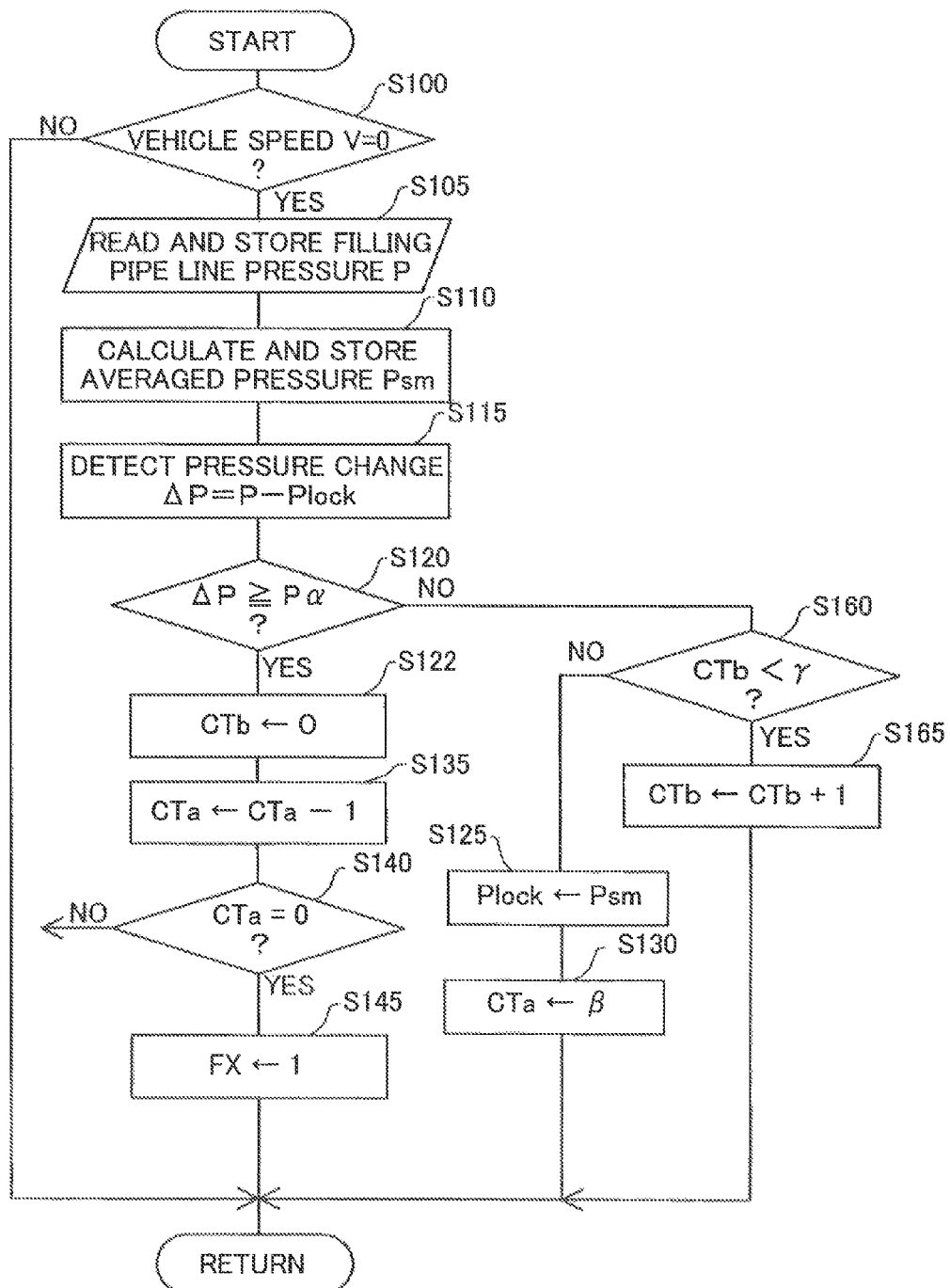

METHOD OF CONTROLLING FUEL CELL SYSTEM

CROSS-REFERENCE TO RELATED APPLICATIONS

The present application claims priority from Japanese patent application P2015-89355 filed on Apr. 24, 2015, the content of which is hereby incorporated by reference into this application.

BACKGROUND

Field

The present invention relates to a method of controlling a fuel cell system.

Related Art

In a fuel cell system, a fuel gas, for example, hydrogen gas is consumed with operation of a fuel cell for power generation, so that there is a need to fill the hydrogen gas into a tank. A proposed configuration for the fuel cell system transmits data with regard to gas filling to and from a gas supply side by communication in the process of filling the hydrogen gas. For example, a system described in JP 2011-156896A sends temperature data in a tank to the gas supply side by communication. The gas supply side controls the filling rate of hydrogen based on the received data and fills hydrogen at the controlled filling rate.

This proposed control technique allows data to be transmitted between the fuel cell system mounted on a vehicle and the gas supply side by communication and advantageously ensures safe supply of hydrogen. The vehicle equipped with the fuel cell and the tank may, however, require a control for the purpose of maintaining the function of the fuel cell even when the vehicle is at stop (vehicle speed=0). In the state that the vehicle is at stop, filling of hydrogen as the fuel is enabled, so that the required control may be performed simultaneously with gas filling. The control of the fuel cell in this state, however, has not been sufficiently considered. For example, a main stop valve of the tank may be opened to allow for supply of the gas, with a view to preventing water from being frozen in the fuel cell during an operation stop period of the fuel cell. Regulation of the relationship between such control and gas filling has not been considered.

A lid for gas filling may be kept open due to some cause, such as carelessness or a wrong valve closing operation of a gas filling operator. In this case, since the lid is open, the gas filling operator can fill the gas. There has, however, been no consideration about permission or prohibition of gas filling according to the operating condition of the fuel cell. The inventors have found the necessity to regulate the relationship between control of the fuel cell and gas filling during the operation stop period of the fuel cell and completed the invention.

SUMMARY

In order to solve at least part of the problems described above, the invention may be implemented by aspects described below.

(1) According to one aspect of the invention, there is provided a method of controlling a fuel cell system. The fuel cell system comprises a fuel cell, a tank that is configured to store a fuel gas filled through a filler port of fuel gas provided in an outer plate of a vehicle, and a main stop valve that is configured to change over between opening and closing to open and close a fuel passage arranged from the tank to the fuel cell. The method may comprise controlling the main stop valve to change over from opening to closing in response to detection of an operation for gas filling to fill the fuel gas into the tank, when a control accompanied with opening of the main stop valve is performed during a stop of the vehicle.

The method of controlling the fuel cell system according to this aspect gives priority to gas filling and changes over the main stop valve from opening to closing. Even when the control accompanied with opening of the main stop valve is performed during vehicle stop, the main stop valve is closed in response to detection of gas filling. As a result, the control accompanied with opening of the main stop valve is not performed parallel to gas filling in an operation stop period of the fuel cell. This contributes to improvement of safety. Even in the case of gas filling with opening a lid provided to cover the filler port of the fuel gas due to some cause such as carelessness or a wrong valve closing operation of a gas filling operator, this configuration causes the main stop valve to be changed over to closing in response to detection of gas filling. This ensures improvement of safety.

(2) The method of controlling the fuel cell system of the above aspect may further comprise giving permission to the control accompanied with opening of the main stop valve based on condition of the fuel cell, when no operation for gas filling is detected in an operation stop period when the fuel cell stops operation for power generation. This allows the control accompanied with opening of the main stop valve to be performed in the operation stop period of the fuel cell without gas filling.

(3) In the method of controlling the fuel cell system of the above aspect, the control accompanied with opening of the main stop valve may be a control performed on satisfaction of a condition that is likely to freeze water in the fuel cell. This allows for a control in response to a likelihood that water is frozen in the fuel cell. The control performed on satisfaction of the condition that is likely to freeze water in the fuel cell may be, for example, a control of discharging water or a control for antifreezing. The condition that is likely to freeze water in the fuel cell is not necessarily limited to the condition that water is actually frozen in the fuel cell but includes a condition that freezing is expected in the fuel cell.

(4) in the method of controlling the fuel cell system of the above aspect, the control accompanied with opening of the main stop valve may be a purging process. In the fuel cell, water is produced on the cathode side in the process of electrochemical reaction of hydrogen and oxygen, and the produced water moves to the anode side. The method of controlling the fuel cell system of this aspect performs a purging process as the control accompanied with opening of the main stop valve, on satisfaction of the condition that water (produced water) is likely to be frozen in the fuel cell. The main stop valve is opened to supply the fuel gas to the fuel cell or more specifically to the anode of the fuel cell and discharge water from the anode. This purging process suppresses water from being frozen in the fuel cell and thereby suppresses deterioration of the performance of the fuel cell. In midwinter or in cold district, there is a possibility that water is frozen on the anode during operation stop of the fuel cell. This purging process prevents the electrolyte membrane from being damaged by freezing of water and prevents the gas flow passage from being blocked by frozen water, thus avoiding or suppressing deterioration of the performs nee of the fuel cell.

As described above, there is a possibility that the operation stop of the fuel cell continues with the lid kept open due to carelessness or the wrong valve closing operation of the gas filling operator. Even in this state, as long as no gas filling is detected, on satisfaction of the condition that water is likely to be frozen in the fuel cell, the control accompanied with opening of the main stop valve is performed and the valve is subsequently kept open to allow the fuel gas to be supplied to the fuel cell. This suppresses water from being frozen in the fuel cell and thereby suppresses deterioration of the performance of the fuel cell.

(5) in the method of controlling the fuel cell system of any of the above aspects, the fuel cell system may further comprise a pressure sensor that is configured to detect a pipe line pressure of a filling pipe provided to fill the fuel gas into the tank, and the operation for gas filling may be detected when an output of the pressure sensor continuously increases over a predetermined time period. This configuration enhances the accuracy of detecting the operation of gas filling and thereby reduces the possibility that the main stop valve is carelessly opened.

The invention may be implemented by any of various aspects other than the method of controlling the fuel cell system described above. According to another aspect, there may be provided a fuel cell system comprising a fuel cell; a tank that is configured to store a fuel gas filled through a filler port of fuel gas provided in an outer plate of a vehicle; a main stop valve that is configured to change over between opening and closing to open and close a fuel passage arranged from the tank to the fuel cell; and a controller that is configured to control opening and closing of the main stop valve. The controller may perform a control accompanied with opening of the main stop valve during a stop of the vehicle, and may control the main stop valve to change over from opening to closing in response to detection of an operation for gas filling to fill the fuel gas into the tank during the control. The invention may also be implemented as a vehicle equipped with the fuel cell system or a method of controlling a vehicle.

BRIEF DESCRIPTION OF DRAWINGS

FIG. 3 is a flowchart showing a main stop valve operation-permit determination process performed during vehicle stop;

FIG. 4 is a diagram illustrating permission for a main stop valve operation;

FIG. 5 is a flowchart showing a procedure of antifreezing operation performed during vehicle stop; and FIG. 6 is a flowchart showing a main stop valve operation-permit determination process according to a modification performed during vehicle stop.

DESCRIPTION OF EMBODIMENTS

Figure 1:
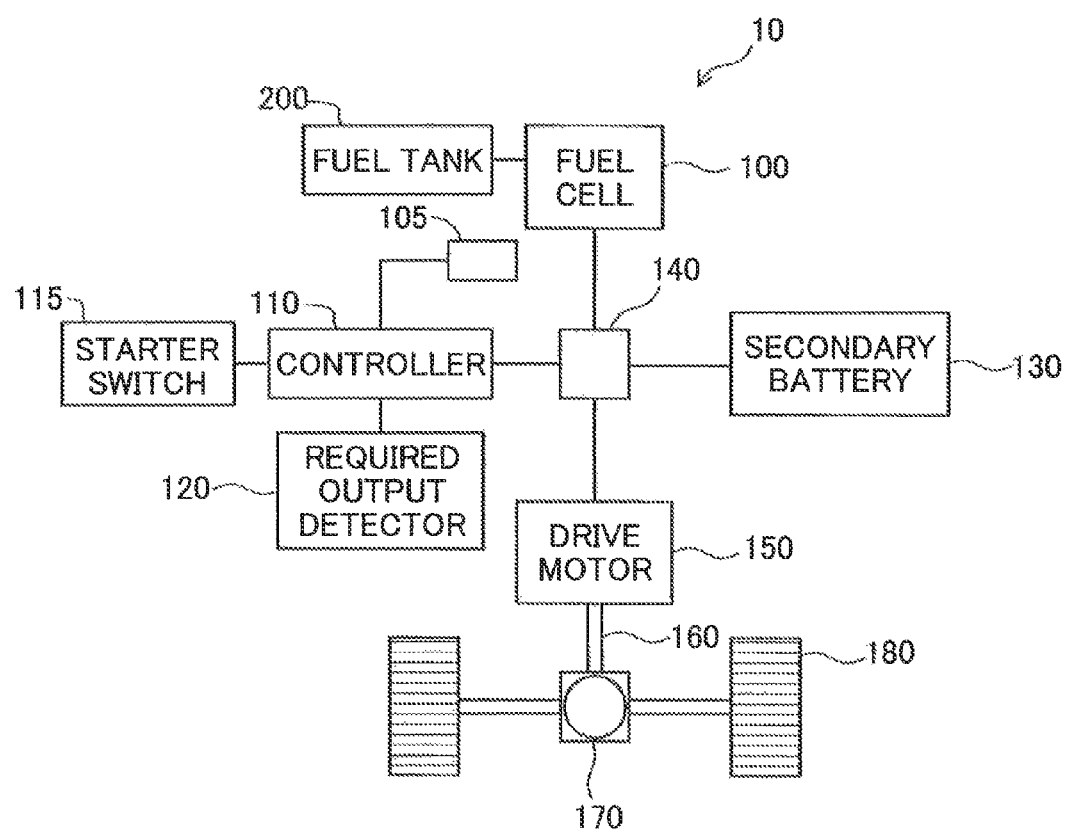
FIG. 1 is a diagram schematically illustrating the configuration of a vehicle which a fuel cell is mounted on according to one embodiment of the invention.

The following describes some embodiments of the invention with reference to the drawings. FIG. 1 is a diagram schematically illustrating the configuration of a vehicle 10 which a fuel cell is mounted on according to one embodiment of the invention. The vehicle 10 includes a fuel cell 100, a temperature sensor 105 configured to detect temperature of the fuel cell 100, a controller 110 (also called ECU (electronic control unit)), a starter switch 115, a required output detector 120, a secondary battery 130, a power distribution controller 140, a drive motor 150, a driveshaft 160, a power distribution gear 170, wheels 180 and a fuel tank 200.

The fuel cell 100 is a power generation apparatus that is configured to generate electric power by electrochemical reaction of a fuel gas and an oxidizing gas. The fuel tank 200 is configured to store the fuel gas used for the fuel cell 100. This embodiment uses hydrogen for the fuel gas. The controller 110 controls the operations of the fuel cell 100 and the secondary battery 130, based on the value of a required output signal obtained from the required output detector 120. The required output detector 120 is configured to detect a depression amount of an accelerator (not shown) of the vehicle 10, estimate the driver's required output based on the detected depression amount and output the estimated required output as the required output signal to the controller 110. The controller 110 calculates a required amount of electric power that is to be required for the fuel cell 100, from the required output signal. The starter switch 115 is a main switch that is configured to switch over between start and stop of the vehicle 10.

The secondary battery 130 is used as the power source for driving the vehicle 10 when the fuel cell 100 has little power generation, for example, immediately after a start of the vehicle 10. For example, a nickel metal hydride battery or a lithium ion battery may be employed for the secondary battery 130. The secondary battery 130 may be charged directly, for example, using the electric power output from the fuel cell 100 or may be charged by regeneration of kinetic energy of the vehicle 10 by the drive motor 150 during deceleration of the vehicle 10.

The power distribution controller 140 receives a command from the controller 110 and comprehensively controls, for example, (1) electric power output from the fuel cell 100 to the drive motor 150; (2) electric power output from the secondary battery 130 to the drive motor 150; and (3) electric power regenerated by the drive motor 150 and output to the secondary battery 130. The drive motor 150 serves as a motor to drive the vehicle 10. The drive motor 150 also serves as a generator to regenerate electric energy from the kinetic energy of the vehicle 10 during deceleration of the vehicle 10. The driveshaft 160 works as a rotating shaft that is configured to transmit the driving power generated by the drive motor 150 to the power distribution gear 170. The power distribution gear 170 is configured to distribute the driving power into the left and right wheels 180.

Figure 2:
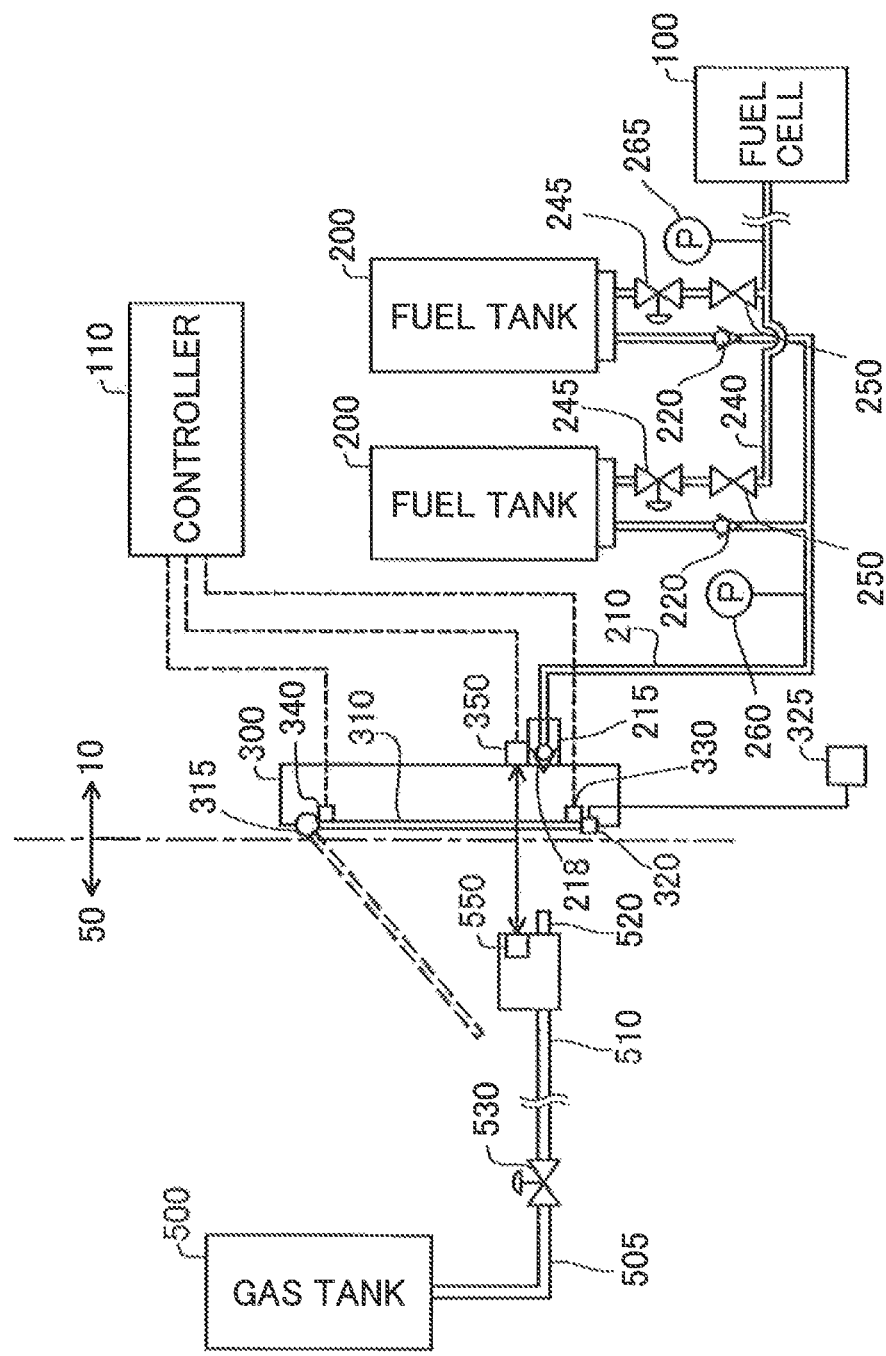
FIG. 2 is a diagram schematically illustrating the configuration of the vehicle from a fuel gas filling system to fuel tanks.

FIG. 2 is a diagram schematically illustrating the configuration of the vehicle 10 from a fuel gas filling system to fuel tanks. Part of a hydrogen station 50 is also illustrated in FIG. 2. The vehicle 10 has two fuel tanks 200 and includes a receptacle 215 provided in a lid box 300, a fuel gas filling pipe 210 arranged to connect; the receptacle 215 with the respective fuel tanks 200 and check valves 220 on the fuel gas supply side. The vehicle 10 also has fuel gas supply tubes 240, main stop valves 245 and regulators 250 provided for the respective fuel tanks 200 and pressure sensors 260 and 265 on the side where the gas is taken out from the fuel tanks 200. The hydrogen station 50 includes a gas tank 500, a gas feed hose 510, a nozzle 520, a valve 530 and an infrared receiver transmitter 550.

The receptacle 215 serves as a hydrogen filler port for filling hydrogen. At the time of gas filling, the nozzle 520 of the hydrogen station 50 is attached to the receptacle 215 by the operation of a gas filling operator. The receptacle 215 includes a non-return valve 218 at the location where the nozzle 520 is attached to prevent the backflow of filled hydrogen. The fuel gas filling pipe 210 is arranged to connect the receptacle 215 with the respective fuel tanks 200. The check valve 220 is placed between the receptacle 215 and each of the fuel tanks 200 to prevent the backflow of hydrogen filled in the fuel tank 200 toward the receptacle 215.

The main stop valve 245 and the regulator 250 are provided in this sequence from the fuel tank 200-side in the fuel gas supply tube 240 arranged to connect the fuel tank 200 with the fuel cell 100. The main stop valve 245 is configured to open and close the fuel gas supply tube 240 and thereby switch over between supply of hydrogen gas from the fuel tank 200 to the fuel cell 100 and stop of gas supply. The internal pressure of the fuel gas filling pipe 210 is detected by the pressure sensor 260, and the detected pressure (filling pipe line pressure P) is output to the controller 110. The internal pressure of the fuel gas supply tube 240 is detected by the pressure sensor 265, and this detected pressure is also output to the controller 110. The internal pressure of the fuel gas filling pipe 210 increases with progress of gas filling and decreases after the gas filling with a decrease in pressure of the fuel tank 200 accompanied by gas consumption. In other words, the internal pressure of the fuel gas filling pipe 210 changes with a change in pressure of the fuel tank 200 by the function of the check valve 220 on the fuel gas supply tube 240-side and a valve mechanism in the mouthpiece of the fuel tank 200. The configuration of this embodiment has the two fuel tanks 200 and accordingly includes the two check valves 220, the two main stop valves 245 and the two regulators 250 provided for the respective fuel tanks 200.

The lid box 300 equipped with the receptacle 215 includes a lid 310, a hinge 315, a lid opener 320, a lid-open button 325, lid sensors 330 and 340 and an infrared receiver transmitter 350. The lid 310 is a cover of the lid box 300 and is attached by the hinge 315 such as to open and close an opening of the lid box 300. The lid box 300 has the lid opener 320 on the opposite side of the hinge 315, in response to an operation of the lid-open button 325, the lid opener 320 is operated to open the lid 310. When the lid 310 is normally closed by the gas filling operator, the lid opener 320 locks the lid 310. A lid lock mechanism may be provided separately from the lid opener 320.

The lid box 300 has the two lid sensors 330 and 340. The first lid sensor 330 is placed in the vicinity of the lid opener 320, and the second lid sensor 340 is placed in the vicinity of the hinge 315. When the lid 310 is opened or closed, the first lid sensor 330 and the second lid sensor 340 respectively generate signals indicating whether the lid 310 is open at different opening degrees of the lid 310. More specifically, each of the lid sensors 330 and 340 is provided corresponding to a pressure protrusion (not shown) of the lid 310. When the lid 310 is closed, the lid sensor 330 (340) is pressed by the pressure protrusion and outputs a close signal to the controller 110. When the lid 310 is opened, the lid sensor 330 (340) is free from pressing by the pressure protrusion and outputs an open signal to the controller 110. As long as the first lid sensor 330 and the second lid sensor 340 are enabled to generate the signals indicating whether the lid 310 is open at the different opening degrees of the lid 310, the first lid sensor 330 and the second lid sensor 340 may not be necessarily placed in the vicinity of the lid opener 320 and in the vicinity of the hinge 315. The lid sensor is not limited to the configuration of such mechanical detection but may be configured to detect opening and closing of the lid 310 optically.

The infrared receiver transmitter 350 is placed in the vicinity of the receptacle 215 and is configured to make communication with the infrared receiver transmitter 550 of the hydrogen station 50. As long as the infrared receiver transmitter 350 is enabled to make communication with the infrared receiver transmitter 550 of the hydrogen station 50, the infrared receiver transmitter 350 may not be necessarily placed in the vicinity of the receptacle 215. The infrared communication is not essential but may be replaced by communication by wire or communication by wireless LAN.

The hydrogen station 50 includes the gas tank 500, a gas pipe 505, the gas feed hose 510, the nozzle 520, the valve 530 and the infrared receiver transmitter 550. The gas tank 500 is provided as a tank configured to store hydrogen. The gas is supplied from the gas tank 500 to the nozzle 520 through the gas pipe 505 and the gas feed hose 510. The gas feed hose 510 is a flexible tube connecting the gas tank 500 with the nozzle 520. The gas pipe 505 is provided with the valve 530. In the case of gas filling at the hydrogen station 50, the vehicle 10 (shown in FIG. 1) stops at a filling position in the station, and the starter switch 115 is turned off. The lid opener 320 is then operated by an operation of the lid-open button 325 to open the lid 310. In this state, the gas filling operator connects the nozzle 520 with the receptacle 215. On completion of gas filling, the gas filling operator disconnects the nozzle 520 from the receptacle 215 and manually closes the lid 310. When the lid 310 is normally closed by the gas filling operator, the lid 310 is locked by the lid opener 320.

The controller 110 is configured as a computer including a CPU, a ROM and a RAM. The controller 110 computes a required amount of electric power corresponding to the required output signal obtained from the required output detector 120, and performs operation control of the fuel cell 100 and the secondary battery 130, in order to obtain the computed required amount of electric power. The controller 110 also performs, for example, an antifreezing operation during vehicle stop and an emergency charging process of the secondary battery 130 on satisfaction of predetermined conditions.

FIG. 3 is a flowchart showing a main stop valve operation-permit determination process performed during vehicle stop. FIG. 4 is a diagram illustrating permission for a main stop valve operation. The main stop valve operation-permit determination process shown in FIG. 3 is repeatedly performed at predetermined time intervals by the controller 110 that receives the supply of electric power from the secondary battery 130 even in the state that the vehicle is at stop and the starter switch 115 is off. On start of this main stop valve operation-permit determination process, the controller 110 first determines whether the vehicle speed V is equal to 0, i.e., whether the vehicle 10 is at stop (step S100). When it is determined that the vehicle 10 is not at stop, the controller 110 determines that the vehicle 10 is during drive and terminates this routine.

When it is determined at step S100 that the vehicle is at stop, the controller 110 reads the sensor output (filling pipe line pressure P) in the fuel gas filling pipe 210 from the pressure sensor 260 and stores the filling pipe line pressure P in a predetermined storage area (step S105). Since it is determined at step S100 that the vehicle speed V=0 and the starter switch 115 is off which is the condition for executing this routine, the fuel cell 100 stops operation. The processing of and after step S105 is accordingly performed during an operation stop period of the fuel cell 100. As described above, even when the starter switch 115 is off, electric power is supplied from the secondary battery 130 to part of the controller 110. The controller 110 can thus perform the processing according to the flowchart of FIG. 3.

Subsequent to step S105, the controller 110 averages the read filling pipe line pressure P to calculate an average pressure Psm and stores the calculated average pressure Psm in a predetermined storage area (step S110). According to this embodiment, the filling pipe line pressure P is averaged by integration with a known time constant. The averaging process may be simple averaging or weighted averaging (smoothing). The controller 110 subsequently detects a pressure change in filling pipe line pressure P read at step S105 (step S115). The pressure change is provided as a change in differential pressure ΔP calculated by subtracting a comparative reference pressure Plock from the read filling pipe line pressure P. The initial value of the comparative reference pressure Plock is set to an internal pressure P0 (MPa) of the fuel gas filling pipe 210. The following description of the respective processes at and subsequent to step S115 is on the assumption that the read filling pipe line pressure P shifts from a period 1 when a pressure increasing change is not detected (non-pressure increasing change) to a period 2 when a pressure increasing change is detected (pressure increasing change).

As shown in FIG. 4, in the case where the change in filling pipe line pressure P is the non-pressure increasing change in the period 1, after determination at step S100 that the vehicle is at stop, the controller 110 reads and stores the filling pipe line pressure P (step S105), averages the filling pipe line pressure P (step S110) and calculates the differential pressure ΔP (step S115). At step S120, the controller 110 subsequently determines whether the calculated differential pressure ΔP is equal to or greater than a threshold pressure Pα. The threshold pressure Pα is specified as an initial increase value (for example, 2 to 3 MPa) of the pipe internal pressure that is naturally provided in the fuel gas filling pipe 210 in the actual process of gas filling from the receptacle 215 (shown in FIG. 2).

In the case where the filling pipe line pressure P is in the non-pressure increasing change of the period 1 when the differential pressure ΔP is less than the threshold pressure Pα, this provides the result of determination of "NO" at step S120. The controller 110 then sequentially performs a process of setting the average pressure Psm averaged at step S110 to the comparative reference pressure Plock (step S125) and a process of setting a counter threshold value β to a pressure increase counter CTa (step S130) and terminates this routine. In the case where the change in filling pipe line pressure P is the non-pressure increasing change, these processes (steps S125 and S130) are repeatedly performed. In the state that the change in filling pipe line pressure P is the non-pressure increasing change, the comparative reference pressure Plock is continually updated to the latest average pressure Pam, and the pressure increase counter CTa is kept at the counter threshold value β.

In the case where the filling pipe line pressure P shifts from the non-pressure increasing change to the pressure increasing change, on the other hand, the differential pressure ΔP becomes equal to or greater than the threshold pressure Pα. This provides the determination result of "YES" at step S120, and the controller 110 proceeds to the processing of and after step S135 as described later. In other words, when the filling pipe line pressure P shifts from the non-pressure increasing change to the pressure increasing change, the controller 110 does not perform the process of setting the average pressure Psm to the comparative reference pressure Plock at step S125. After the filling pipe line pressure P shifts from the non-pressure increasing change to the pressure increasing change, the comparative reference pressure Plock is accordingly fixed to the average pressure Psm in the non-pressure increasing change immediately before the shift of the filling pipe line pressure P to the pressure increasing change as shown in FIG. 4. In the state of the pressure increasing change, the differential pressure ΔP is calculated at step S115 by subtracting the average pressure Psm in the non-pressure increasing change immediately before the shift of the filling pipe line pressure P to the pressure increasing change, from the filling pipe line pressure P.

In the state that the filling pipe line pressure P is in the pressure increasing change, subsequent to the determination at step S120, the controller 110 decrements the value of the pressure increase counter CTa by value 1 (step S135) and determines whether the value of the pressure increase counter CTa is equal to value 0 (step S140). When it is determined at step S140 that CTa is not equal to 0, the controller 110 terminates this routine. In the state that the filling pipe line pressure P is in the pressure increasing change, this decrement of the pressure increase counter CTa (step S135) is repeated on every call of the routine of FIG. 3. Repetition of the decrement of the pressure increase counter CTa in the state that the filling pipe line pressure P is in the pressure increasing change results in decrementing the pressure increase counter CTa to the value 0. After the determination at step S140, the controller 110 sets a main stop valve operation-permit flag FX (initial value=0) to value 1 (step S145) and terminates the routine. The main stop valve operation-permit flag FX is provided as a flag that permits operation of the main stop valve 245 (shown in FIG. 2) and is used to determine the operation of the main stop valve 245 in the antifreezing operation described later.

The situation that provides the determination result of "YES" at both steps S120 and S140, i.e., the situation that the filling pipe line pressure P is kept in the pressure increasing change for a time period that is longer than a time duration corresponding to the counter threshold value β, appears in the process of gas filling through the fuel gas filling pipe 210. The processing of steps S135 to S145 subsequent to the determination of step S120 is accordingly performed to set the main stop valve operation-permit fag FX in the case where the vehicle 10 is at stop (step S100: YES) and actual gas filling is detected (step S120: YES). The main stop valve operation-permit flag FX is set to the value 1 in the case of detection of actual gas filling and may be reset to the initial value 0, for example, at the timing of completion of the gas filling operation or at the timing of detection of closing the lid 310. Completion of the gas filling operation may be detected, based on information that the infrared receiver transmitter 350 receives from the hydrogen station 50-side by infrared communication.

FIG. 5 is a flowchart showing a procedure of antifreezing operation performed during vehicle stop. The antifreezing operation is repeatedly performed at predetermined intervals by the controller 110 in the state that the starter switch 115 (shown in FIG. 1) is off. The controller 110 first determines whether the fuel cell 100 stops the operation for power generation (step S210). When the starter switch 115 is off, the fuel cell 100 generally stops the operation for power generation. This determination is accordingly for the purpose of confirmation. This determination may be, for example, based on requirement or non-requirement for power generation from the required output detector 120

(shown in FIG. 1). When it is determined that the fuel cell 100 does not stop the operation for power generation, the controller 110 terminates this routine without any further processing.

When it is determined at step S210 that the fuel cell 100 stops the operation, the controller 110 subsequently determines whether a fuel cell temperature Tf is equal to or lower than a threshold temperature Tc, based on the output of the temperature sensor 105 provided in the fuel cell 100 (shown in FIG. 2) (step S220). This threshold temperature Tc is set in advance as temperature at which produced water is likely to be frozen in the fuel cell 100. The determination at step S220 that, the fuel cell temperature Tf is equal to or lower than the threshold temperature Tc may lead to determination that a predetermined condition that water is likely to be frozen in the fuel cell 100 is satisfied in an operation stop period of the fuel cell 100. Produced water during operation of the fuel cell 10 may be left in the fuel cell 100. When it is determined that the temperature Tf of the fuel cell 100 is higher than the threshold temperature Tc (step S220), the controller 110 terminates this routine without any further processing. The determination of step S220 may be, for example, based on comparison between a fuel cell ambient temperature detected by an ambient temperature sensor (not shown) and a predetermined threshold temperature.

When it is determined that the fuel cell temperature Tf is equal to or lower than the threshold temperature Tc (step S220), on the other hand, the controller 110 subsequently determines whether the main stop valve operation-permit flag FX is equal to the value 1 (step S230). The main stop valve operation-permit flag FX is set to the value 1 in response to detection of filling of hydrogen gas into the fuel tank 200 by the processing routine shown in FIG. 3. When it is determined at step S230 that the main stop valve operation-permit flag FX is not the value 1, in order to perform the protective operation for preventing produced water from being frozen in the operation stop period of the fuel cell 100, the controller 110 outputs a valve opening signal to the main stop valve 245 (shown in FIG. 2) to open the main stop valve 245 and thereby supply the hydrogen gas from the fuel tank 200 to the fuel cell 100 or more specifically to the anode of the fuel cell 100 for a predetermined time period (step S240) and then terminates this routine. The supply of the gas (gas purging) at step S240 causes water to be discharged from the anode of the fuel cell 100, with a view to preventing freezing of water in the fuel cell 100.

When it is determined at step S230 that the main stop valve operation-permit flag FX is the value 1, on the other hand, although the low temperature Tf of the fuel cell 100 suggests the necessity for the protective operation for the purpose of antifreezing, the controller 110 outputs a valve closing signal to the main stop valve 245 to close the main stop valve 245 (step S250) and does not permit the protective operation. The controller 110 then terminates the routine. When the valve closing signal of the main stop valve 245 is output at step S250 during the protective operation for antifreezing, (step S240), the supply of the gas (gas purging) for antifreezing is discontinued. Such non-permission or discontinuation of gas purging continues until the determination of step S230 in a next or subsequent cycle of this routine after filling of hydrogen gas is completed and the main stop valve operation-permit flag FX is reset (FX=0).

It is determined at step S230 that the flag FX is the value 1, as the result that gas filling is actually performed during vehicle stop and the processing of steps S135 to S145 is sequentially performed in the main stop valve operation-permit determination process of FIG. 3.

The vehicle 10 of the embodiment having the configuration described above has the following advantageous effects. There is a possibility that the lid 310 is kept open by the carelessness or the wrong valve closing operation of the gas filling operator while the vehicle 10 is at stop, for example, while the vehicle 10 stops at the hydrogen station 50. More specifically, the gas filling operator may not close the lid 310 or may incompletely close the lid 310 with pressing the first lid sensor 330 with a finger. In this case, although a signal indicating that the lid 310 is closed, the lid 310 is actually kept open. This situation allows for gas filling, although the situation is actually ready for the protective operation such as gas purging in the operation stop period when the fuel cell 100 stops operation. The vehicle 10 of this embodiment deals with this situation as described below.

In the situation that allows for both gas filling and the protective operation as described above, in response to detection of fuel gas filling into the fuel tank 200 (the determination result of "YES" at step S120 and subsequent steps S135 and S140 in FIG. 3), the vehicle 10 of the embodiment does not allow the main stop valve 245 to be opened or closes the open main stop valve 245 (step S250) based on the setting of the main stop valve operation-permit flag FX to the value 1 (step S145 in FIG. 3 and the determination result of "YES" at step S230 in FIG. 5). The vehicle 10 of the embodiment discontinues or does not permit the protective operation such as gas purging in the operation stop period of the fuel cell 100 that requires opening of the main stop valve 245. This ensures improvement of safety in the state of gas filing.

In response to non-detection of filling of hydrogen gas (fuel gas) into the fuel tank 200 (step S120: NO), on the other hand, when the fuel cell temperature Tf decreases to the threshold temperature Tc at which water is likely to be frozen in the operation stop period of the fuel cell 100 (step S220: YES), the vehicle 10 of the embodiment opens the main stop valve 245 in the operation stop period (step S240) to allow for the gas supply (to supply hydrogen gas) from the fuel tank 200 to the fuel cell 100 and discharge water from the anode. The vehicle 10 of the embodiment accordingly performs the protective operation of the fuel cell 100 in the operation stop period and suppresses deterioration of the performance of the fuel cell 100 due to freezing of water. In other words, the vehicle 10 of the embodiment discontinues or does not permit the gas supply to the fuel cell 100 in the state of gas filling. This ensures improvement of safety in the operation stop period of the fuel cell 100 and provides the opportunity of gas supply for the purpose of antifreezing to protect the fuel cell 100.

When the output (filling pipe line pressure P) of the pressure sensor 260 provided in the fuel gas filling pipe 210 continuously increases for the predetermined continuation period specified by the pressure increase counter CTa (the determination result of "YES" at step S120 and subsequent steps S135 and S140), the vehicle 10 of the embodiment detects gas filling into the fuel tank 200 and sets the main stop valve operation-permit flag to the value 1 (step S146). The vehicle 10 of the embodiment can thus detect gas filling into the fuel tank 200 with high accuracy. This avoids the gas supply to the fuel cell 100 from being carelessly discontinued or prohibited, thus enhancing the effectiveness of protection of the fuel cell 100.

In the process of detecting gas filling based on the filling pipe line pressure P, after the shift of the filling pipe line pressure P from the non-pressure increasing change to the pressure increasing change, the vehicle 10 of the embodiment fixes the comparative reference pressure Plock to the average pressure Psm in the non-pressure increasing change immediately before the shift of the filling pipe line pressure P to the pressure increasing change (step S125) as shown in FIG. 4. This provides the following advantageous effects.

Averaging the filling pipe line pressure P (step S110 in FIG. 3) is performed with regard to the filling pipe line pressure P in the pressure increasing change. The average pressure Psm after the shift of the filling pipe line pressure P from the non-pressure increasing change to the pressure increasing change increases accompanied with the pressure increasing change of the filling pipe line pressure P as shown in FIG. 4. The average pressure Psm calculated at step S110 in each cycle of FIG. 3 with regard to the filling pipe line pressure P in the pressure increasing change is set to the comparative reference pressure Plock. The differential pressure $\Delta P$ between the filling pipe line pressure P and the average pressure Psm (=comparative reference pressure Plock) in this state is not significantly different from the differential pressure $\Delta P$ at the beginning of the pressure increasing change as shown in FIG. 4. After the shift of the filling pipe line pressure P from the non-pressure increasing change to the pressure increasing change, on the other hand, the determination result of "NO" is provided at step S120 and the processing flow does not proceed to step S125. Accordingly the comparative reference pressure Plock is fixed to the average pressure Psm in the non-pressure increasing change immediately before the shift of the filling pipe line pressure P to the pressure increasing change. This makes the differential pressure $\Delta P$ more noticeable and thus ensure detection of gas filling with the higher accuracy.

The following describes modifications. FIG. 6 is a flowchart showing a main stop valve operation-permit determination process according to a modification performed during vehicle stop. The main stop valve operation-permit determination process of the modification is characterized by dealing with an assumed state that the filling pipe line pressure P as the sensor output is temporarily decreased by the effect of, for example, superposition of noise after the shift of the filling pipe line pressure P from the non-pressure increasing change to the pressure increasing change.

The main stop valve operation-permit determination process of FIG. 6 is repeatedly performed at predetermined time intervals by the controller 110 like the determination process of FIG. 3 and is similar to the determination process of FIG. 3 except addition of steps S122, S160 and S165. The controller 110 performs the series of processing from the determination whether the vehicle is at stop (step S100) to the comparison between the differential pressure $\Delta P$ and the threshold pressure P$\alpha$ (step S120) in the same manner as the main stop valve operation-permit determination process of FIG. 3. When it is determined at step S120 that the differential pressure $\Delta P$ is less than the threshold pressure P$\alpha$, the controller 110 compares a pressure decrease counter CTb with a counter threshold value $\gamma$ (step S160). The counter threshold value $\gamma$ is set to a counter value corresponding to an elapsed time which is sufficient for determination that a decrease in filling pipe line pressure P is attributed to superposition of noise or the like after the shift of the filling pipe line pressure P from the non-pressure increasing change to the pressure increasing change. This counter threshold value $\gamma$ is used to detect a short time period that allows for removal of the effect of noise and is smaller than the counter threshold value $\beta$ with regard to the pressure increase counter CTa described above ($\gamma<\beta$). The counter threshold value $\gamma$ or a value larger than the counter threshold value $\gamma$ is set as the initial value to the pressure decrease counter CTb at the time of off operation of the starter switch 115

(shown in FIG. 2). In the state that the filling pipe line pressure P is kept in the non-pressure increasing change shown in FIG. 4, the controller 110 determines that the pressure decrease counter CTb is larger than the counter threshold value $\gamma$ (step S160). The controller 110 then sequentially sets the average pressure Psm averaged at step S110 to the comparative reference pressure Plock (step S125) and sets the counter threshold value $\beta$ to the pressure increase counter CTa (step S130) and terminates the routine. In the determination process of this modification, in the state that the filling pipe line pressure P is in the non-pressure increasing change, setting the average pressure Psm to the comparative reference pressure Plock (step S125) and setting the counter threshold value $\beta$ to the pressure increase counter CTa (step S130) are repeatedly performed. Accordingly, in the state that the filling pipe line pressure P is in the non-pressure increasing change, the comparative reference pressure Plock is continually updated to the latest average pressure Psm, and the pressure increase counter CTa is kept at the counter threshold value $\beta$.

When the filling pipe line pressure P is shifted from the non-pressure increasing change to the pressure increasing change as shown in FIG. 4 (step S120: YES), on the other hand, the pressure decrease counter Ctb is reset to the value 0 (step S122). In the case where the filling pipe line pressure P shifts to the pressure increasing change and then returns to the non-pressure increasing change shown in FIG. 4, it is determined at step S160 that the pressure decrease counter CTb (=0) is less than the counter threshold value $\gamma$. In response to this determination result at step S160, the controller 110 increments the value of the pressure decrease counter CTb by value 1 (step S165) and terminates the routine.

In the case where the determination result that the pressure decrease counter CTb is less than the counter threshold value $\gamma$ at step S160 is attributed to an actual decrease in filling pipe line pressure P, the filling pipe line pressure P is kept in the non-pressure increasing change after that. Repetition of this routine sequentially increments the pressure decrease counter CTb and eventually makes the pressure decrease counter CTb equal to or greater than the counter threshold value $\gamma$. This provides the determination result of "NO" at step S160. The controller 110 accordingly performs the process of setting the average pressure Psm to the comparative reference pressure Plock (step S125) and the subsequent process as described above. In the case where the filling pipe line pressure P is temporarily decreased by the effect of superposition of noise or the like, on the other hand, the controller 110 increments the pressure decrease counter CTb (step S165) subsequent to the determination that the pressure decrease counter CTb is less than the counter threshold value $\gamma$ (step S160). The differential pressure $\Delta P$, however, becomes greater than the threshold pressure P$\alpha$, before the pressure decrease counter CTb reaches the counter threshold value $\gamma$. This provides the determination result of "YES" at step S120. The controller accordingly does not perform the process of setting the average pressure Psm to the comparative reference pressure Plock (step S125). Accordingly the comparative reference pressure Plock is fixed to the average pressure Psm in the non-pressure increasing change immediately before the shift of the filling pipe line pressure P to the pressure increasing change as shown in FIG. 4. In this state, the counter threshold value $\beta$ is not set to the pressure increase counter CTa.

After elimination of the temporary decrease of the filling pipe line pressure P, the filling pipe line pressure P is returned to the pressure increasing change prior to the temporary decrease. At step S115 of this routine after elimination of the temporary decrease, the controller 110 calculates the differential pressure ΔP between the actual filling pipe line pressure P and the comparative reference pressure Plock that is fixed to the average pressure Psm in the non-pressure increasing change immediately before the shift of the filling pipe line pressure P to the pressure increasing change. The controller 110 then determines that the differential pressure ΔP becomes equal to or greater than the threshold pressure Pα at step S120. After this determination, the controller 110 resets the pressure decrease counter CTb which indicates the elapsed time since the determination at step S120 that the differential pressure ΔP is less than the threshold pressure Pα, to the value 0 (step S122). The pressure decrease counter CTb is also reset in the case where the filling pipe line pressure P is kept in the pressure increasing change. In this case, however, it is not determined at step S120 that the differential pressure ΔP is less than the threshold pressure Pα. This accordingly causes no trouble.

After resetting the pressure decrease counter CTb, the controller 110 performs the same series of processing (steps S135 to S145) as the main stop valve operation-permit determination process of the above embodiment shown in FIG. 3. When the pressure increase counter CTa is decremented to the value 0 (step S140: YES), the controller 110 sets the main stop valve operation-permit flag FX (initial value=0) to the value 1 (step S145) and terminates this routine.

In the state of gas filling, the vehicle 10 that performs the main stop valve operation-permit determination process of the modification described above also does not permit the gas supply to the fuel cell 100 or discontinues the gas supply to the fuel cell 100. This ensures improvement of safety in the operation stop period of the fuel cell 100 and provides the opportunity of gas supply for the purpose of antifreezing to protect the fuel cell 100. Additionally, the vehicle 10 that performs the main stop valve operation-permit determination process of the modification has the following advantageous effects.

In the case of a decrease in filling pipe line pressure P in the pressure increasing change, when this pressure decrease is only a temporary decrease due to superposition of noise or the like and the filling pipe line pressure P is returned to the pressure increasing change after a short time period, the vehicle 10 that performs the main stop valve operation-permit determination process of the modification keeps the comparative reference pressure Mock at the average pressure Psm in the non-pressure increasing change immediately before the shift, of the filling pipe line pressure P to the pressure increasing change and also does not reset but keeps the value of the pressure increase counter CTa. The vehicle 10 that performs the main stop valve operation-permit determination process of the modification can thus detect execution or non-execution of gas filling with higher accuracy, based on the elapsed time since the beginning of the shift of the filling pipe line pressure P from the non-pressure increasing change to the pressure increasing change even in the case of a temporary decrease in filling pipe line pressure P.

The invention is not limited to any of the embodiments, the examples and the modifications described above but may be implemented by a diversity of other configurations without departing from the scope of the invention. For example, the technical features of any of the embodiments, the examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

The above embodiment performs the gas purging control (protective operation) accompanied with opening the main stop valve 245 to prevent water from being frozen, as the control performed in parallel to gas filling, in the operation stop period of the fuel cell 100 with the lid kept open due to some cause such as carelessness or the wrong valve closing operation of the gas filling operator. This control is, however, not restrictive. For example, in the operation stop period of the fuel cell 100, power consumption of the secondary battery 130 by auxiliary machinery including audio equipment in the vehicle interior, head lamps and interior light may cause the secondary battery 130 to be almost fully discharged. In this case, there may be a necessity for emergency charging of the secondary battery 130 in the operation stop period of the fuel cell 100 to be ready for a start of the vehicle that is currently at atop. In the operation stop period of the fuel cell 100 with the lid kept open due to some cause such as carelessness or the wrong valve closing operation of the gas filling operator, the control performed in parallel to gas filling may thus be charging control of the secondary battery 130.

The process of the above embodiment does not permit the gas supply to the fuel cell 100 to prevent water from being frozen or discontinues the gas supply, in the state of gas filling in the operation stop period of the fuel cell 100. This configuration is, however, not restrictive. According to a modification, the gas supply to the fuel cell 100 accompanied with opening of the main stop valve 245 may be permitted only in the state of operation stop of the fuel cell 100 without detection of gas filling. This modification also ensures improvement of safety in the operation stop period of the fuel cell 100 and provides the opportunity of gas supply to prevent water from being frozen.

The process of the above embodiment detects filling of hydrogen gas (fuel gas) into the fuel tank 200 based on the filling pipe line pressure P of the fuel gas filling pipe 210 in the pressure increasing change and determines that the operation for gas filling is performed. This configuration is, however, not restrictive. In the state of as filling, the infrared receiver transmitter 350 and the infrared receiver transmitter 550 are connected with each other to transmit data between the hydrogen station 50 and the vehicle 10 (more specifically the controller 110). According to a modification, it may be determined that the operation for gas filling is performed, in response to detection of data transmission by connection of the infrared receiver transmitter 350 with the infrared receiver transmitter 550. According to another modification, attachment of the nozzle 520 to the receptacle 215 provided in the lid box 300 may be detected by a sensor, and it may be determined that the operation for gas filling is performed, in response to detection of attachment of the nozzle 520 by the sensor.

In the embodiment or the modification described above, the main stop valve 245 is kept closed or the open main stop valve 245 is closed during filling of the fuel gas, based on the setting of the main stop valve operation-permit flag FX. A modification may not use this flag but may directly close the open main stop valve 245 or keep the main stop valve 245 closed at step S145. The above embodiment describes gas purging to remove water from the fuel cell 100 for the purpose of antifreezing as the example of the protective operation of the fuel cell 100. The antifreezing operation is, however, not restrictive. A modification may perform an operation of flowing the fuel gas to adjust the humidity to an adequate range in the case where the humidity on the anode side is excessively high and interferes with power generation of the fuel cell.

What is claimed is:

1. A method of controlling a fuel cell vehicle, the fuel cell vehicle comprising:
 a fuel cell;
 a tank that is configured to store a fuel gas;
 a pressure sensor that is configured to detect a filling flow path pressure of the fuel gas from a filler port of fuel gas provided in the fuel cell vehicle to the tank;
 a main stop valve that is provided in a fuel passage arranged from the tank to the fuel cell;
 a speed sensor configured to detect a speed of the fuel cell vehicle; and
 a controller that reads a signal from the speed sensor and the pressure sensor, and drives the main stop valve,
 the method comprising:
  determining that the fuel cell vehicle is at a stop based on the signal from the speed sensor, and that the fuel cell stops the operation,
  placing the main stop valve in a closing state, even if it is determined that a control accompanied with opening of the main stop valve is required, when it is determined that an operation for gas filling to fill the fuel gas into the tank is performed, based on the signal from the pressure sensor, and
  placing the main stop valve in an opening state to provide the control accompanied with opening of the main stop valve, when it is determined that the control accompanied with opening of the main stop valve is required, and when it is not detected that the operation for gas filling to fill the fuel gas into the tank is performed.

2. The method of controlling the fuel cell system according to claim 1,
 the method further comprising
 giving permission to the control accompanied with opening of the main stop valve based on condition of the fuel cell, when no operation for gas filling is detected in an operation stop period when the fuel cell stops operation for power generation.

3. The method of controlling the fuel cell system according to claim 2,
 wherein the control accompanied with opening of the main stop valve is a control performed on satisfaction of a condition that is likely to freeze water in the fuel cell.

4. The method of controlling the fuel cell system according to claim 3,
 wherein the control accompanied with opening of the main stop valve is a purging process.

5. The method of controlling the fuel cell system according to claim 1,
 wherein the fuel cell system further comprises a pressure sensor that is configured to detect a pipe line pressure of a filling pipe provided to fill the fuel gas into the tank, and
 the operation for gas filling is detected when an output of the pressure sensor continuously increases over a predetermined time period.

6. A fuel cell vehicle, comprising:
 a fuel cell;
 a tank that is configured to store a fuel gas;
 a pressure sensor that is configured to detect a filling flow path pressure of the fuel gas from a filler port of fuel gas provided in the fuel cell vehicle to the tank;
 a main stop valve that is provided in a fuel passage arranged from the tank to the fuel cell;
 a speed sensor configured to detect a speed of the fuel cell vehicle; and
 a controller that reads a signal from the speed sensor and the pressure sensor, and drives the main stop valve,
 wherein the controller is configured to:
  determine that the fuel cell vehicle is at a stop based on the signal from the speed sensor, and that the fuel cell stops the operation,
  place the main stop valve in a closing state, even if it is determined that a control accompanied with opening of the main stop valve is required, when it is determined that an operation for gas filling to fill the fuel gas into the tank is performed, based on the signal from the pressure sensor, and
  place the main stop valve in an opening state to provide the control accompanied with opening of the main stop valve, when it is determined that the control accompanied with opening of the main stop valve is required, and when it is not detected that the operation for gas filling to fill the fuel gas into the tank is performed.

* * * * *